(12) United States Patent
Zheng (10) Patent No.: US 7,364,230 B2
(45) Date of Patent: Apr. 29, 2008

(54) PORTABLE MOUNTING DEVICE FOR MOBILE ENTERTAINMENT UNIT

(76) Inventor: Edward Zheng, 1661 Fairplex Dr., La Verne, CA (US) 91750

( * ) Notice: Subject to any disclaimer, the term of this patent is extended or adjusted under 35 U.S.C. 154(b) by 192 days.

(21) Appl. No.: 10/961,662

(22) Filed: Oct. 8, 2004

(65) Prior Publication Data

US 2006/0079306 A1    Apr. 13, 2006

(51) Int. Cl.
    *A47C 7/72*    (2006.01)
(52) U.S. Cl. .................................. 297/188.2; 297/217.4
(58) Field of Classification Search ............ 297/188.2, 297/188.06, 217.4; 248/917; 224/275
    See application file for complete search history.

(56) References Cited

U.S. PATENT DOCUMENTS

| | | | | |
|---|---|---|---|---|
| 5,833,101 A | * | 11/1998 | Watkins | 224/275 |
| 6,315,180 B1 | * | 11/2001 | Watkins | 224/275 |
| 6,607,241 B2 | * | 8/2003 | Johnston | 297/188.06 |
| 7,070,237 B2 | * | 7/2006 | Rochel | 297/217.3 |
| 7,111,814 B1 | * | 9/2006 | Newman | 248/274.1 |
| 7,201,443 B2 | * | 4/2007 | Cilluffo et al. | 297/188.06 |

FOREIGN PATENT DOCUMENTS

GB    2239639 A    *    7/1991

* cited by examiner

*Primary Examiner*—Milton Nelson, Jr.
(74) *Attorney, Agent, or Firm*—Raymond Y. Chan; David and Raymond Patent Firm (57) ABSTRACT

A portable mounting device for mounting a mobile entertainment unit onto two spaced apart supporters includes an elongated housing, a fixture mounting unit and an entertainment mounting device. The fixture mounting unit includes two retention arms spacedly provided on the fixture mounting side of the elongated housing for detachably engaging with the supporters respectively, and an adjuster provided at the elongated housing to selectively adjust the retention distance between the retention arms. The entertainment mounting device provided on the holding side of the elongated housing for detachably holding the mobile entertainment unit in position so as to securely support the mobile entertainment unit by the supporters.

41 Claims, 7 Drawing Sheets

PORTABLE MOUNTING DEVICE FOR MOBILE ENTERTAINMENT UNIT

BACKGROUND OF THE INVENTION

1. Field of Invention

The present invention relates to a mounting device, and more particularly to a portable mounting device for a mobile entertainment unit which is adapted for mounting the entertainment unit on two spaced apart supporters, such as two head support extensions of a vehicle seat.

2. Description of Related Arts

Mobil entertainment units, such as portable DVD players, have widely utilized for playing multimedia materials in outdoors environment. They are usually compact in size, foldable, and contain rechargeable battery so as to become a self-contained unit for providing maximum convenience to their users.

One common disadvantage of those traditional mobile entertainment units is that they usually lack some sorts of supports or mounting arrangements for them to be attached on a secure structure, such as the two head support extensions of a vehicle seat, so that their users do not need to hold them manually during the course of playing a particular set of multimedia materials. For example, where DVD movie lasts for few hours, it is almost impossible for the user to hold it for the entire duration and they have to seek place for supporting the mobile entertainment unit.

In order to solve this problem, supporting devices for mobile entertainment units have been developed to provide some sorts of supports to the relevant mobile entertainment units. Specifically, those supporting devices may be embodied as a supporting stand extended from a bottom portion of the mobile entertainment unit for supporting it to standing on a flat surface. Alternatively, the supporting devices may be adapted for suspendedly mounting onto a wall surface via some sorts of hangers provided thereon such that the users may be able to comfortably enjoy the multimedia materials at a distance from the mobile entertainment unit.

Such conventional supporting devices, although useful in some circumstances, lack one important feature which facilitates them for use in a moving vehicle, such as in a car traveling for a long journey. On the one hand, the supporting stands are generally inapplicable in that for a regular car, there doesn't exist any supporting platform in the car's cabinet for supporting the mobile entertainment unit. On the other hand, for those who want to mount the mobile entertainment unit onto the back of a car's seat, one should be unable to find any hangers provided thereon unless they are artificially yet destructively affixed at the back of the car's seat.

Even if the mobile entertainment unit can somewhat be attached at the back's of the car's seat, probably at the expense of imparting a certain amount of destruction thereof, they can be extremely inflexible in practical use. For example, it is likely to be the case that only the one who sits right behind the seat on which the mobile entertainment unit is mounted can comfortably view the multimedia materials playing thereon. The one sitting next would be unable to comfortably view the same multimedia materials due to extremely narrow viewing angle. Furthermore, even for the one who sits right behind the mobile entertainment unit, the extent to which the display screen thereof can be adjusted to suit different body's size must be questioned.

Therefore, one can easily appreciate the inherent difficulty in conventional usage of the mobile entertainment units and the inadequacy which the conventional arts have provided to resolve the problem.

SUMMARY OF THE PRESENT INVENTION

A main object of the present invention is to provide a portable mounting device for a mobile entertainment unit which is adapted for detachably mounting the entertainment unit on two spacedly apart supporters, such as two head support extensions of a vehicle seat, in such a way as to impart maximum flexibility and comfort to those viewing the multimedia materials shown on the mobile entertainment unit.

Another object of the present invention is to provide a portable mounting device which is adapted to detachably mount a mobile entertainment unit at the back of a car's seat in such a manner that the mobile entertainment unit is capable of being adjusted to fit a particular viewing angle so as to serve a maximum number of viewers behind the car's seat.

Another object of the present invention is to provide a portable mounting device for mounting a mobile entertainment unit onto a car's seat, wherein the portable mounting device does not cause any surface destruction to the mobile entertainment unit as well as the car's seat, so that the present invention fits for widespread utilizations.

Another object of the present invention is to provide a portable mounting device which does not involves complicated mechanical components for performing the mounting mechanism, so that the manufacturing cost and the ultimate selling price of the present invention can be minimized.

Accordingly, in order to accomplish the above objects, the present invention provides a portable mounting device for mounting a mobile entertainment unit onto two spaced apart supporters, comprising:

an elongated housing, having a length substantially longer than a distance between the supporters, having a fixture mounting side and a holding side;

a fixture mounting unit, which comprises:

two retention arms spacedly provided on the fixture mounting side of the elongated housing for detachably engaging with the supporters respectively, wherein at least one of the retention arms is slidably mounted to the elongated housing to define a retention distance between the retention arms; and an adjuster provided at the elongated housing to selectively adjust the retention distance between the retention arms, wherein when the retention distance of the retention arms is adjusted corresponding to the distance between the two supporters, the two retention arms are adapted for substantially engaging with the two supporters respectively so as to securely support the elongated housing by the supporters; and an entertainment mounting device provided on the holding side of the elongated housing for detachably holding the mobile entertainment unit in position so as to securely support the mobile entertainment unit by the supporters.

From another perspective, the present invention also provides a portable mounting device for mounting a mobile entertainment unit onto a pair of supporting bars, comprising:

an elongated housing having a fixture mounting side, a holding side and two stopper ends at the holding side;

a fixture mounting unit provided on the fixture mounting side of the elongated housing for detachably mounting the elongated housing to the supporters respectively; and an entertainment mounting device, which comprises:

two holding arms each having an inner pivot end pivotally mounted on the holding side of the elongated housing and an outer fastening end adapted for detachably engaging with a sidewall of the mobile entertainment unit; and two folding arms, each having a biasing end pivotally connected to the respective holding arms and a sliding end slidably mounted on the holding side of the elongated housing, wherein the sliding ends of the folding arms are slidably blocked at the two stopper ends of the elongated housing to substantially retain the holding arms in position that the two holding arms are transversely extended from the elongated housing for engaging the fastening ends of the holding arms at the sidewalls of the mobile entertainment unit so as to securely support the mobile entertainment unit by the supporters.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
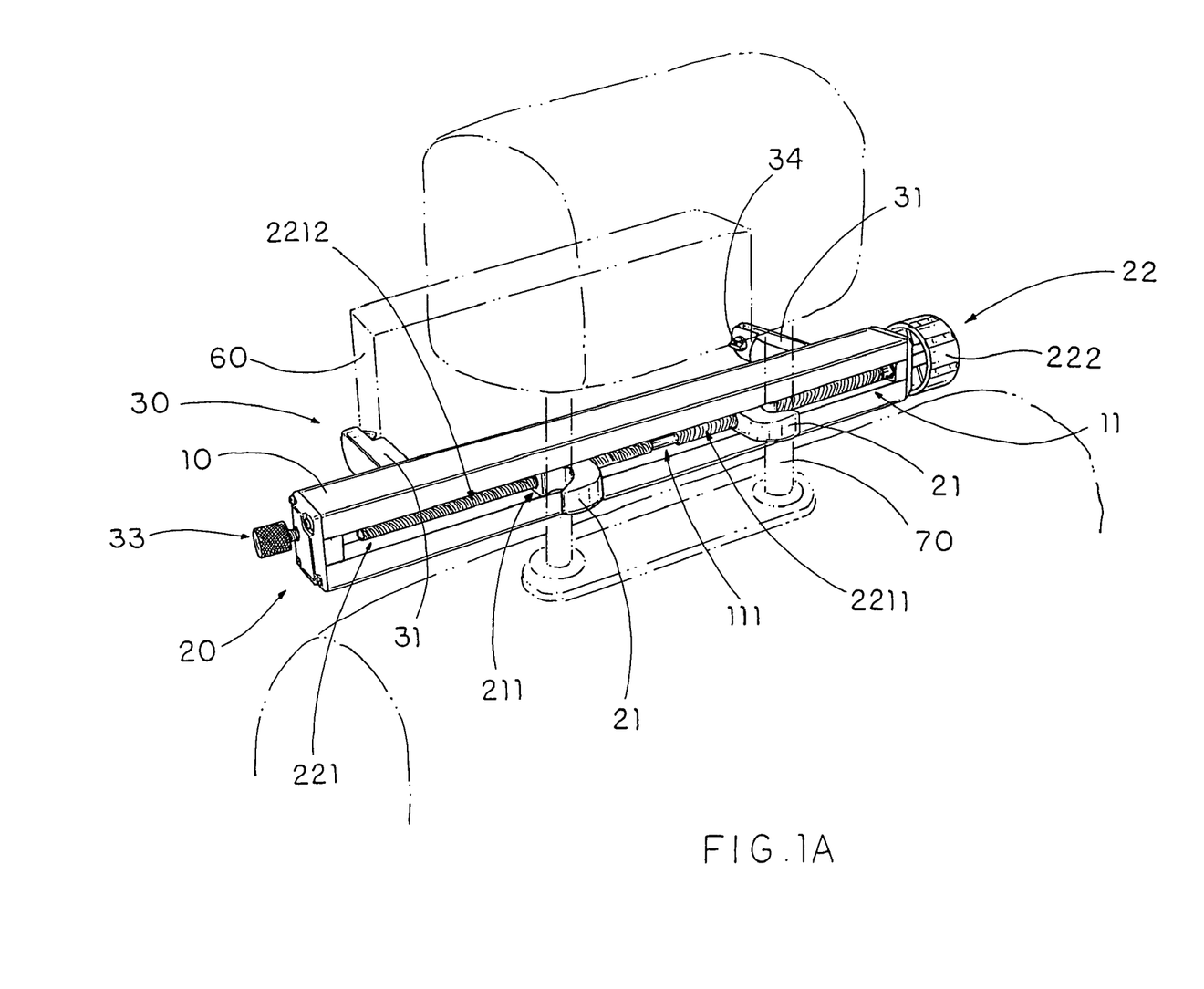
FIG. 1A is a perspective view of a portable mounting device according to a preferred embodiment of the present invention, illustrating the portable mounting device being mounted to the supporters.
Figure 1B:
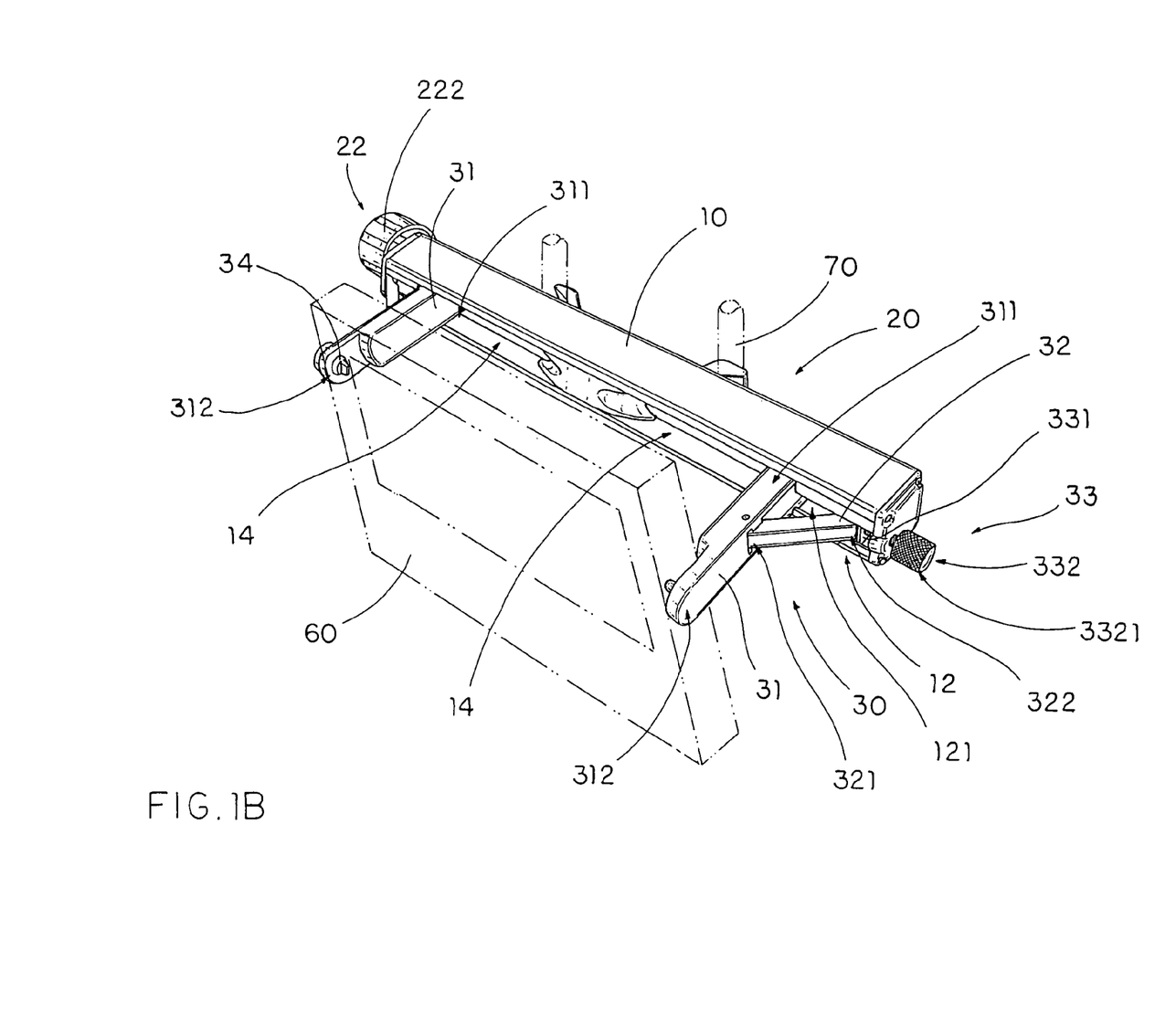
FIG. 1B is a perspective view of a portable mounting device according to the above preferred embodiment of the present invention, illustrating the mobile entertainment unit being mounted to the portable mounting device.
Figure 3:
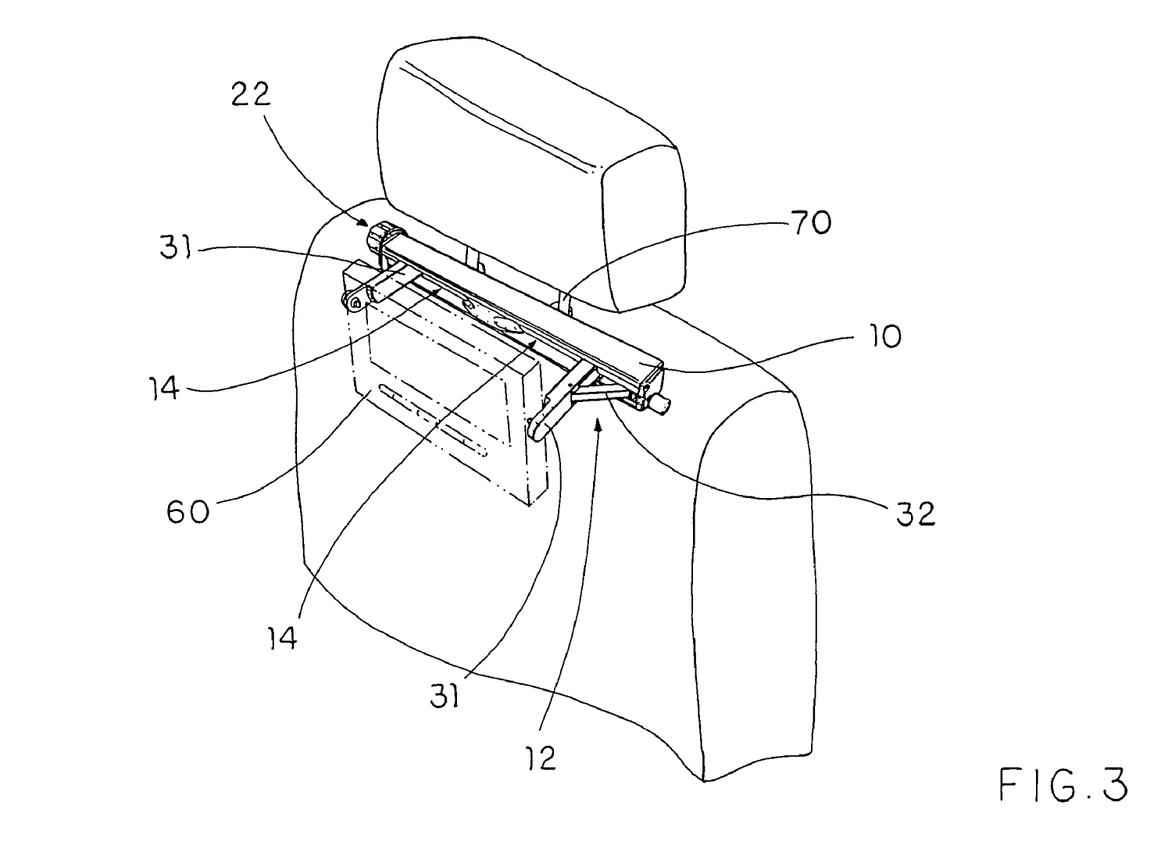
FIG. 3 illustrates an application of the portable mounting device according to the above preferred embodiment of the present invention.

Referring to FIGS. 1A, 1B and 3 of the drawings, a portable mounting device for mounting a mobile entertainment unit 60 onto two spacedly apart supporters 70 is illustrated. The mobile entertainment unit 60, such as a DVD player or other multimedia player, is mounted by the portable mounting device on the two supporters 70, such as the two extension bars connecting between a head rest and a seat back of a vehicle seat. Therefore, the head rest is adapted to be selectively adjusted a height from the seat back according to the head size of the user.

According to the preferred embodiment, the mobile entertainment unit 60 is detachably supported at a rear side of the vehicle seat for providing optimal display of the relevant multimedia materials to a user(s) seating at the back of that vehicle seat. Accordingly, the portable mounting device comprises an elongated housing 10, a fixture mounting unit 20, and an entertainment mounting device 30.

The elongated housing 10, having a length substantially longer than a distance between the supporters 70, has a fixture mounting side 11 facing towards the supporters 70 for communicating therewith, and a holding side 12 facing outwardly for communicating with the mobile entertainment unit 60.

The fixture mounting unit 20 is provided on the fixture mounting side 11 of the elongated housing 10 for detachably mounting the elongated housing 10 to the two supporters 70 respectively.

Figure 2:
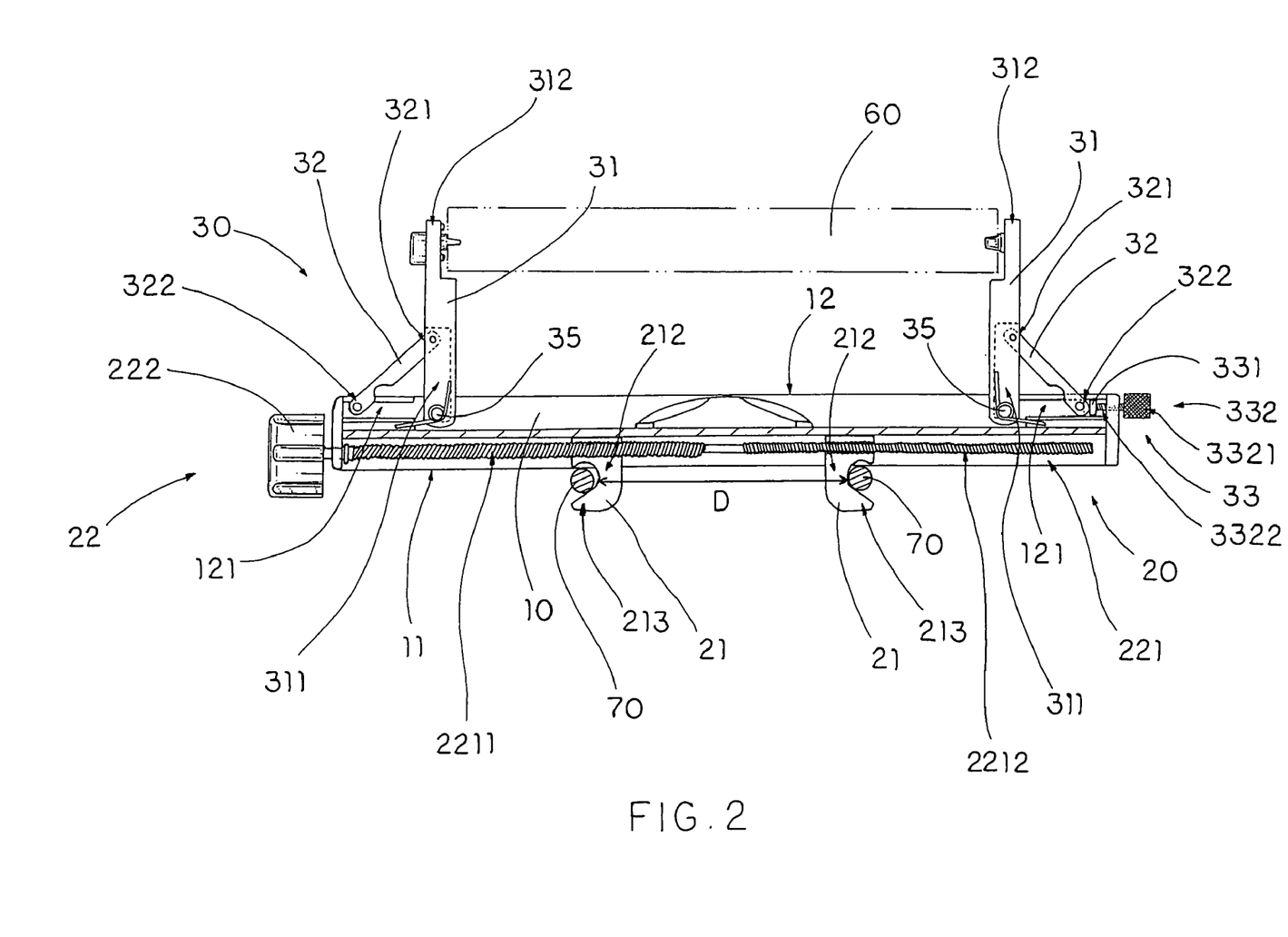
FIG. 2 is a sectional view of the portable mounting device according to the above preferred embodiment of the present invention.

Specifically, referring to FIG. 1A and FIG. 2 of the drawings, the fixture mounting unit 20 comprises two retention arms 21 and an adjuster 22. The two retention arms 21 are spacedly provided on the fixture mounting side 11 of the elongated housing 10 for detachably engaging with the supporters 70 respectively, wherein at least one of the retention arms 21 is slidably mounted to the elongated housing 10 to define a retention distance D between the retention arms 21.

The adjuster 22 is provided at the elongated housing 10 to selectively adjust the retention distance between the retention arms 21, wherein when the retention distance D of the retention arms 21 is adjusted corresponding to the distance between the two supporters 70, the two retention arms 21 are adapted for substantially engaging with the two supporters 70 respectively so as to securely support the elongated housing by the supporters 70.

Referring FIG. 1B of the drawings, the entertainment mounting device 30 is provided on the holding side 12 of the elongated housing 10 for detachably holding the mobile entertainment unit 60 in position so as to securely support the mobile entertainment unit 60 by the two supporters 70.

Specifically, the entertainment mounting device 30 comprises two holding arms 31 each having an inner pivot end 311 pivotally mounted on the holding side 12 of the elongated housing 10, and an outer fastening end 312 adapted for detachably engaging with a sidewall of the mobile entertainment unit 60 so as to retain the mobile entertainment unit 60 within the two holding arms 31.

Furthermore, the entertainment mounting device 30 further comprises two folding arms 32 each having a biasing end 321 pivotally connected to the respective holding arms 31, and a sliding end 322 slidably mounted on the holding side 12 of the elongated housing 10, wherein the sliding ends 322 of the folding arms 32 are slidably blocked at two stopper ends 13 of the elongated housing 10 to substantially retain the holding arms 31 in position that the two holding arms 31 are transversely extended from the elongated housing 10 for engaging the fastening ends 312 of the holding arms at the sidewalls of the mobile entertainment unit 60 so as to securely support the mobile entertainment unit 60 by the supporters 70.

The elongated housing 10 further has two receiving slots 14 indently and longitudinally formed at two end portions of the holding side 12 respectively wherein the two holding arms 31 are adapted to pivotally unfolded to transversely extend from the elongated housing 10 for engaging the fastening ends 312 of the holding arms with the sidewalls of the mobile entertainment unit 60 respectively, and pivotally and inwardly folded to receive into the receiving slots 14 respectively for minimizing a depth of the present invention.

Moreover, as shown in FIG. 1A of the drawings, according to the preferred embodiment, the elongated housing further has an elongated sliding slot 111 longitudinally formed on the fixture mounting side 11 wherein the retention arms 21 are slidably mounted in the elongated sliding slot 111 and communicated with the adjuster 22 in such a manner that the adjuster 22 is adapted to guide the retention arms 21 slidably moving along the sliding slot 111 so as to adjust the retention distance D between the two retention arms 21 for fittedly engaging with the two supporters 70 by the two retention arms 21 respectively.

Referring to FIG. 1B and FIG. 2 of the drawings, the adjuster 22 comprises a guiding shaft 221 and an adjusting knob 222, wherein the guiding shaft 221 extends along the elongated sliding slot 111, and has a free end extended out of the elongated housing 10 through a sidewall thereof to connect with the adjusting knob 222 in such a manner that the adjusting knob 222 is capable of rotatably driving the guiding shaft 221 rotating within the elongated sliding slot 111. In other words, the guiding shaft 221 is longitudinally disposed in the elongated housing 10 wherein the adjusting knob 222 connected to the free end of the guiding shaft 221 at the sidewall of the elongated housing 10 to drive the guiding shaft 221 to rotate. Therefore, the two retention arms 21 are slidably connected along the guiding shaft 221 such that when the guiding shaft 221 is driven to be rotated, the two retention arms 21 are slid along the guiding shaft 221 to adjust the retention distance D for engaging with the supporters 70.

In addition, the guiding shaft 221 further has first longitudinal thread portions 2211 having a plurality of first screwing teeth and second longitudinal thread portions 2212 having a plurality of second screwing teeth, wherein the two retention arms 21 are slidably engaged with the first and second longitudinal thread portions 2211, 2212 respectively.

Thus, each of the retention arms 21 has a through boring hole 211 transversely formed thereon in which the guiding shaft 221 is arranged to pass through the boring holes 211 of the retention arms 21 so as to engage the first and the second thread portions 2211, 2212 with the two retention arms 21 at the two boring holes 211 respectively.

The first and the second thread portions 2211, 2212 have opposite pitch for the first and the second screwing teeth respectively, so that by rotating the guiding shaft 221, the two retention arms 21 are adapted to slidably move along the sliding slot 111 in an opposite direction as guided by the respective thread portions 2211, 2212 so as to adjust the retention distance D between the two retention arms 21. From the forgoing descriptions, it can thus be shown that the rotational motion in a single direction of the adjusting knob 222 is adapted to drive the retention arms 21 simultaneously moving in opposite directions for adjusting the retention distance D.

Referring FIG. 1A and FIG. 2 of the drawings, each of the retention arms 21 has an extending portion 212 outwardly and transversely extended from the fixture mounting side 11 of the elongated housing 10, and a gripping tip portion 213 sidewardly bend from the extending portion 212 to define a gripping hook adapted for biasing against the respective supporter 70, wherein the extending portion 212 of the retention arms 21 are adjusted to space apart by the retention distance D corresponding with the distance between the two supporters 70, such that the gripping hooks are adapted for fittedly gripping on the supporters 70 so as to mount the elongated housing 10 on the supporters 70.

There are two points to note regarding the fixture mounting unit 20. First the gripping tip portions 213 of the retention arms 21 are preferably bent at the respective extending portion 212 in an opposite direction so as to form the two gripping hooks. FIG. 2 illustrates that the two gripping hooks of the gripping tip portions 213 are outwardly bent at two opposite directions away from each other so as to engage with two inner sides of the supporters 70 respectively.

Figure 4:
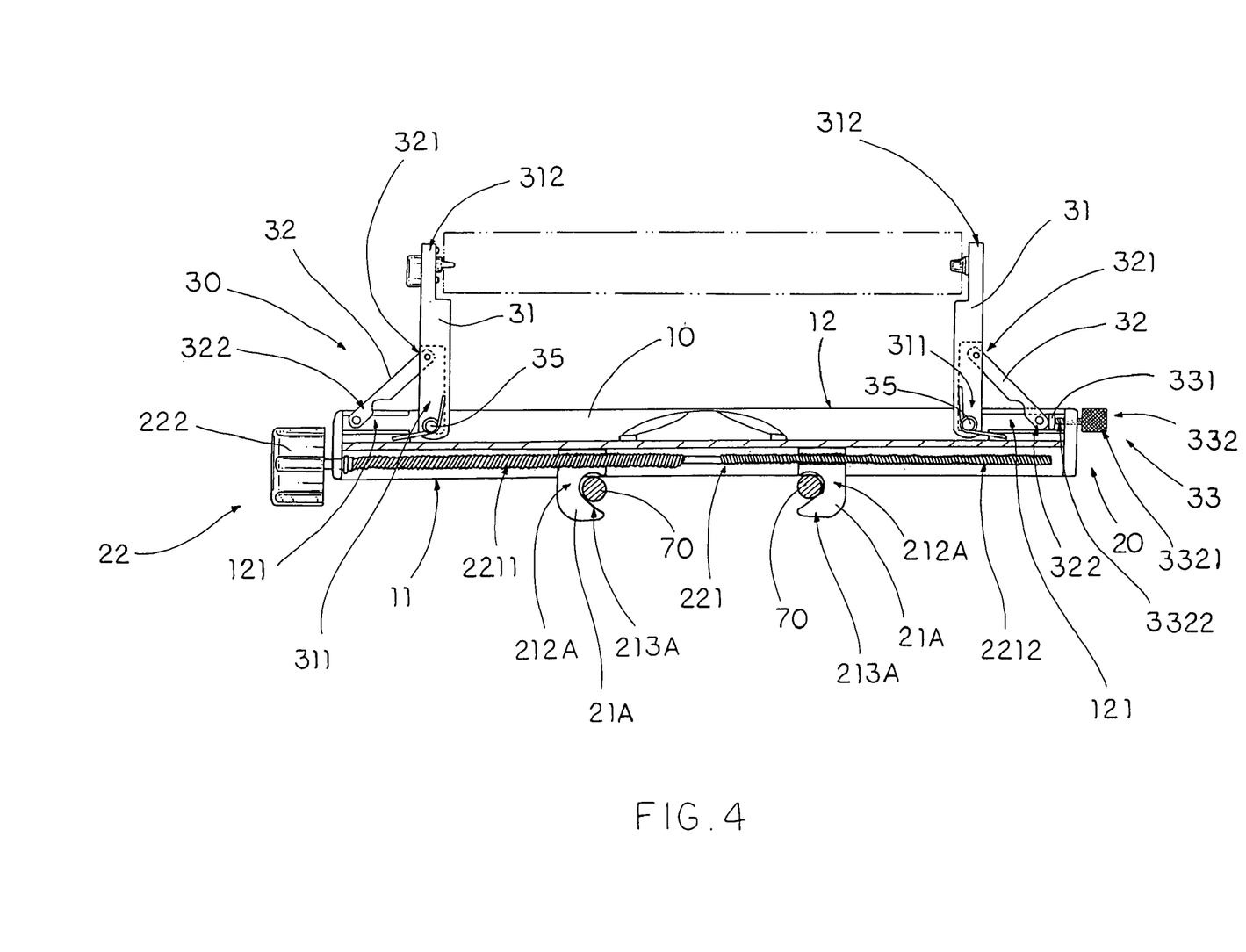
FIG. 4 illustrates a first alternative mode of the fixture mounting unit of the portable mounting device according to the above preferred embodiment of the present invention.

Alternatively, the gripping hooks of the gripping portions 213A can be inwardly bent from the respective extending portion 212A at two opposite directions respectively towards each other for engaging with two outer sides of the supporters 70 respectively, as shown in FIG. 4. Note that the retention arms 21A are moving towards each other so as to securely engage with the supporters 70.

Figure 5:
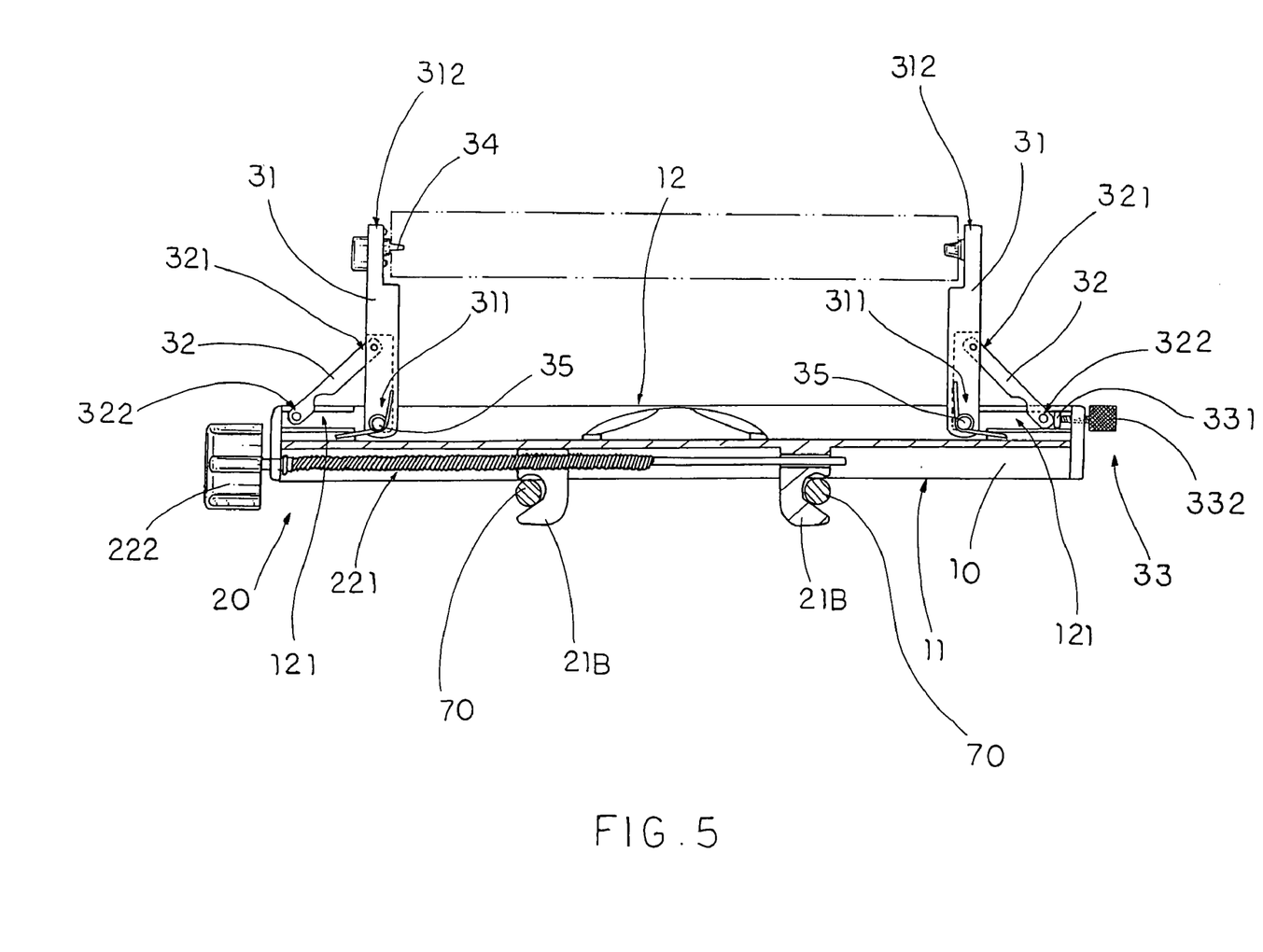
FIG. 5 illustrates a second alternative mode of the fixture mounting unit of the portable mounting device according to the above preferred embodiment of the present invention.

The second point to note is that in order to adjust the retention distance D, one of the retention arms 21B can be affixed at the fixture mounting side 11 whereas the other retention arm 21 is slidably moved along the elongated sliding slot 111 for adjusting the retention distance. In such a case, the guiding shaft 221 would only have one single thread portion for engaging with the slidable retention arm 21B so that the adjusting knob 222 is only capable of driving the slidable retention arm 21B for adjusting the retention distance. In other words, one of the retention arms 21B is slidably connected along the guiding shaft 221 while another the retention arm 21B is affixed to the elongated housing 10 such that when the guiding shaft 221 is driven to be rotated, the respective retention arm 21B is slid along the guiding shaft 221 to adjust the retention distance D for engaging with the supporters 70, as shown in FIG. 5. In addition, the gripping hooks of the retention arms 21B can be bending outwardly such that the gripping hooks of the retention arms 21B are adapted for substantially engaging with two inner sides of the supporters 70 respectively when the retention distance D matches with the distance between the two supporters 70. Likewise, the retention arms 21B can be bending inwardly such that the gripping hooks of the retention arms 21B are adapted for substantially engaging with two outer sides of the supporters 70 respectively.

Referring to FIG. 1B of the drawings, the elongated housing 10 further has two holding slots 121 formed at two end portions of the holding side 12 of the elongated housing 10 wherein the two sliding ends 322 of the two folding arms 32 are slidably mounted on the holding side 12 at the two holding slots 121 respectively for blocking at the stopper end 13 of the elongated housing 10.

In addition, the entertainment mounting device 30 further comprises a stopper end regulator 33 provided on the holding side 12 of the elongated housing 10 for fine tuning one of the stopper ends 13 thereof so as to stop the sliding ends 322 of the respective folding arms 32 at a predetermined position for adjusting a distance between the two folding arms 32 to for matching with a width of the mobile entertainment unit 60.

Specifically, the stopper end regulator 33 comprises an arm stopper 331 slidably provided in one of the holding slots 121 at the respective stopper end 13 of the elongated housing 10, and a fine tuner 332 rotatably connected to the arm stopper 331 at a respective sidewall of the elongated housing 10 in such a manner that the fine tuner 332 is adapted to adjust a position of the arm stopper 331 in the respective folding slot 121 so as to alter a position of the respective stopper end 13 for stopping a sliding movement of the sliding end 322 of the respective folding arm 32. In other words, the fine tuner 332 is arranged to drive the arm stopper 331 to longitudinally slide along the elongated housing 10 at a position that the sliding end 322 of the respective folding arm 32 is slidably blocked by the arm stopper 331.

According to the preferred embodiment of the present invention, the fine tuner 332 has an elongated screwing portion 3321 having an inner end connected to the arm stopper 331, and a cylindrical tuner head 3322 extended to an exterior of the elongated housing 10 for rotatably driving the elongated screwing portion 3321 within the respective folding slot 121. The elongated screwing portion 3321 is engaged with a respective sidewall of the elongated housing 10 in such a manner that a rotational movement of the elongated screwing portion 3321 is converted to a longitudinal movement thereof so as to adjust the position of the arm stopper 331.

When the holding arms 31 are folded to receive into the receiving slots 14 at the holding side 12, the biasing end 321 of the folding arm 32 is overlappedly aligned with the respective holding arm 31 while the sliding end 322 is slid at an inner end of the holding slot 121. Subsequently, when the holding arms 31 are pivotally unfolded, the biasing ends 321 of the folding arms 32 are pivotally guided by the pivot movement of the respective holding arm 31 while the sliding ends 322 are slid to the respective stopper end 13 of the elongated housing 10 so as to inclinedly support the holding arms 31 in position.

As a result, by adjusting a position of the arm stopper 331, the extent to which the respective holding arms 31 can be unfolded (also the angle between the holding arm 31 and the elongated housing 10) is substantially limited by the arm stopper 331 of the holding arm 32 at the sliding end 322 so that a horizontal distance between two fastening ends 312 of the holding arms 31 can accordingly be adjusted. As such, the holding arms 31 are adapted to hold mobile entertainment units 60 of differing width so as to maximize a compatibility of the present invention.

With respect to the entertainment mounting device 30, there are two points which are noteworthy. First, the sliding end regulator 33 may be provided at all the two holding slots 121 respectively so as to adjust the distance between the two holding arms 31. Alternatively, as shown in FIGS. 1A and 2 of the drawings, the sliding end regulator 33 is provided at only one of the holding slots 121 whereas the extent to which another holding arm 31 can be unfolded is fixed by a nonadjustable stopper end 13. As such, the distance between the two holding arms 31 can also be adjusted by fine tuning the only sliding end regulator 33 on the holding side 12.

In order to lock up the mobile entertainment unit 60 in position on the holding arms 31, the entertainment mounting device 30 further comprises at least one pivot lock 34 transversely extended from the one of the fastening end 311 of the respective holding arm 31 for fittingly engaging with one of the slots provided on the sidewalls of the mobile entertainment unit 60. The pivot lock 34 is preferably embodied as an engaging button protruded from the respective fastening end 311 to engage with the engaging slot provided on a sidewall of the mobile entertainment unit 60 so as to restrict a pivotal movement thereof with respect to the holding arms 31. The engaging button is specifically crafted and designed to form a polygon cross section or non-circular cross section corresponding to the shape of the slot on the sidewall of the mobile entertainment unit 60 such that the mobile entertainment unit 60 is incapable of pivotally moving about the pivot lock 34.

The entertainment mounting device 30 further comprises two resilient elements 35 mounting the holding arms 31 with the holding side 12 of the elongated housing 10 for normally retaining the holding arms 31 folding to receive into the receiving slots 14 respectively. In other words, the holding arms 31 are normally received in the receiving slots 14 in order to minimize a depth of the present invention for convenient carrying and storage. Accordingly, the resilient elements 35 are two coil spring mounted at two pivot points of the inner pivot ends 311 of the holding arms 31 for applying an urging force against the holding arms 31 to normally fold the holding arms 31 inwardly to receive in the receiving slots 14 respectively.

Figure 6:
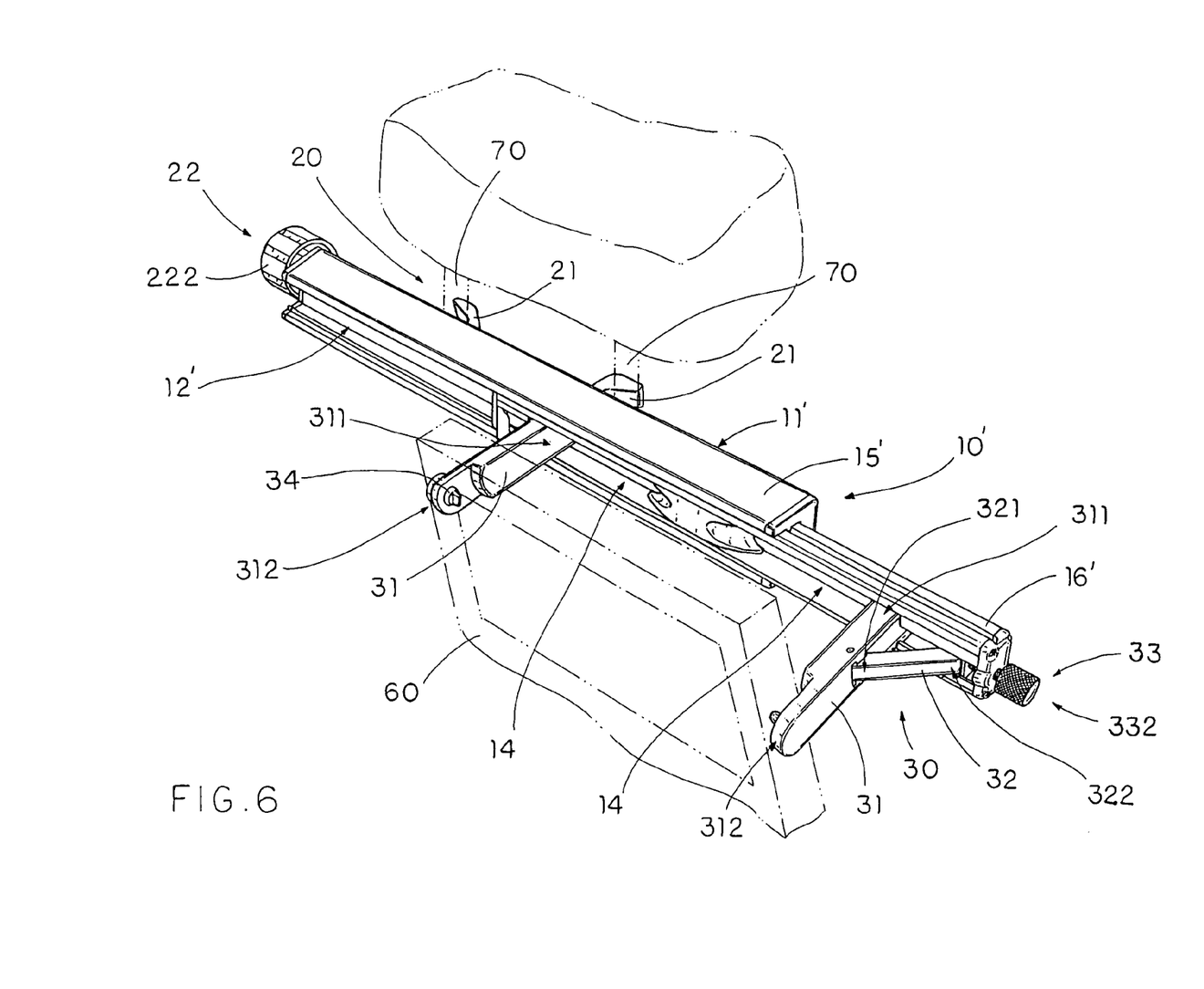
FIG. 6 illustrates an alternative mode of the elongated housing of the portable mounting device according to the above preferred embodiment of the present invention.

Referring to FIG. 6 of the drawings, an alternative mode of the elongated housing 10' of the portable mounting device according to the preferred embodiment of the present invention is illustrated, for allowing the present invention to be utilized to achieve an optimal viewing angle for the users seating at the back of the vehicle seat. The alternative mode is similar to the preferred embodiment except the elongated housing 10'.

According to the alternative mode, the elongated housing 10' comprises a mounting frame 15' having the fixture side 11' thereon and a holding frame 16' having the holding side 12' thereon and slidably connected to the mounting frame 15' such that the holding frame 16' is sidewardly slid on the mounting frame 15' for selectively adjusting a position of the entertainment unit 60 with respect to the supporter 70. In other words, the fixture mounting unit 20 is provided on the fixture mounting side 11' of the elongated housing 10' for detachably mounting the elongated housing 10 to the two supporters 70 respectively and the entertainment mounting device 30 is provided on the holding side 12' of the elongated housing 10' for detachably holding the mobile entertainment unit 60 in position. Therefore, when the holding frame 16' is sidewardly slid on the mounting frame 15', the mobile entertainment unit 60 is correspondingly moved from the back of the vehicle seat in a sideward direction.

As a practical application therefore, a user is able to mount the mounting frame 15' on the supporters 70 of the vehicle seat, and slidably and sidewardly extend the holding frame 16' towards the adjacent vehicle seat so as to adjust an optimal viewing angle for those sitting at the back of the vehicle seats. In other words, the mobile entertainment unit 60 is capable of sidewardly displaced at a position between two vehicle seats to provide an optimal viewing angle those sitting at the back of the vehicle seat on which the mounting frame 15' is mounted.

From the forgoing descriptions, it can be shown that the above-mentioned objects have been substantially achieved. The present invention effectively and conveniently mounts the mobile entertainment unit 60 onto the supporters 70 of a vehicle seat such that a user is able to enjoy multimedia materials during a long car's journey.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A portable mounting device for a mobile entertainment unit which is adapted for mounting to two spaced apart supporters, wherein said portable mounting device comprises:

an elongated housing, having a length substantially longer than a distance between said supporters, having a fixture mounting side and a holding side;

a fixture mounting unit, which comprises:

two retention arms spacedly provided on said fixture mounting side of said elongated housing for detachably engaging with said supporters respectively, wherein at least one of said retention arms is slidably mounted to said elongated housing to define a retention distance between said two retention arms; and an adjuster provided at said elongated housing to selectively adjust said retention distance between said retention arms, wherein when said retention distance of said retention arms is adjusted corresponding to said distance between said two supporters, said two retention arms are adapted for substantially engaging with said two supporters respectively so as to securely support said elongated housing by said supporters; and an entertainment mounting device provided on said holding side of said elongated housing for detachably holding said mobile entertainment unit in position so as to securely support said mobile entertainment unit by said supporters.

2. The portable mounting device, as recited in claim 1, wherein said elongated housing further has an elongated sliding slot longitudinally formed on said fixture mounting side, wherein each of said retention arms has a gripping hook which is transversely extended from said elongated housing through said sliding slot and is bending outwardly such that said gripping hooks of said retention arms are adapted for substantially engaging with two inner sides of said supporters respectively when said retention distance matches with said distance between said two supporters.

3. The portable mounting device, as recited in claim 1, wherein said elongated housing further has an elongated sliding slot longitudinally formed on said fixture mounting side, wherein each of said retention arms has a gripping hook which is transversely extended from said elongated housing through said sliding slot and is bending inwardly such that said gripping hooks of said retention arms are adapted for substantially engaging with two outer sides of said supporters respectively when said retention distance matches with said distance between said two supporters.

4. The portable mounting device, as recited in claim 1, wherein said adjuster comprises a guiding shaft longitudinally disposed in said elongated housing and an adjusting knob connected to a free end of said guiding shaft at a sidewall of said elongated housing to drive said guiding shaft to rotate, wherein one of said retention arms is slidably connected along said guiding shaft while another said retention arm is affixed to said elongated housing such that when said guiding shaft is driven to be rotated, said respective retention arm is slid along said guiding shaft to adjust said retention distance for engaging with said supporters.

5. The portable mounting device, as recited in claim 4, wherein said elongated housing further has an elongated sliding slot longitudinally formed on said fixture mounting side, wherein each of said retention arms has a gripping hook which is transversely extended from said elongated housing through said sliding slot and is bending outwardly such that said gripping hooks of said retention arms are adapted for substantially engaging with two inner sides of said supporters respectively when said retention distance matches with said distance between said two supporters.

6. The portable mounting device, as recited in claim 4, wherein said elongated housing further has an elongated sliding slot longitudinally formed on said fixture mounting side, wherein each of said retention arms has a gripping hook which is transversely extended from said elongated housing through said sliding slot and is bending inwardly such that said gripping hooks of said retention arms are adapted for substantially engaging with two outer sides of said supporters respectively when said retention distance matches with said distance between said two supporters.

7. The portable mounting device, as recited in claim 4, wherein said elongated housing comprises a mounting frame having said fixture side thereon and a holding frame, having said holding side thereon, slidably connected to said mounting frame such that said holding frame is sidewardly slid on said mounting frame for selectively adjusting a position of said entertainment unit with respect to said supporters.

8. The portable mounting device, as recited in claim 4, wherein said entertainment mounting device comprises two holding arms each having an inner pivot end pivotally mounted on said holding side of said elongated housing and an outer fastening end adapted for detachably engaging with a sidewall of said mobile entertainment unit, and two folding arms, each having a biasing end pivotally connected to said respective holding arms and a sliding end slidably mounted on said holding side of said elongated housing, wherein said sliding ends of said folding arms are slidably blocked at two stopper ends of said elongated housing to substantially retain said holding arms in position that said two holding arms are transversely extended from said elongated housing for engaging said fastening ends of said holding arms at said sidewalls of said mobile entertainment unit so as to securely support said mobile entertainment unit by said supporters.

9. The portable mounting device, as recited in claim 8, wherein said entertainment mounting device further comprises a stopper end regulator provided on said holding side of said elongated housing to fine tune one of said stopper ends thereof so as to stop said respective sliding end of said folding arms at a predetermined position for adjusting a distance between said two folding arms for matching with a width of said mobile entertainment unit.

10. The portable mounting device, as recited in claim 8, wherein said entertainment mounting device further comprises at least a pivot lock, having a non-circular cross section, transversely extended from one of said fastening ends of said respective holding arm for fittingly engaging with a slot on said respective sidewall of said mobile entertainment unit so as to restrict a pivotal movement thereof with respect to said holding arms.

11. The portable mounting device, as recited in claim 8, wherein said elongated housing further has two receiving slots longitudinally formed at two end portions of said holding side respectively and two resilient elements provided at said inner pivot ends of said holding arms respectively for applying an urging force against said holding arms to normally fold said holding arms inwardly to receive in said receiving slots respectively.

12. The portable mounting device, as recited in claim 1, wherein said adjuster comprises a guiding shaft longitudinally disposed in said elongated housing and an adjusting knob connected to a free end of said guiding shaft at a sidewall of said elongated housing to drive said guiding shaft to rotate, wherein said two retention arms are slidably connected along said guiding shaft such that when said guiding shaft is driven to be rotated, said two retention arms are slid along said guiding shaft to adjust said retention distance for engaging with said supporters.

13. The portable mounting device, as recited in claim 12, wherein said guiding shaft has a first longitudinal threaded portion slidably engaged with one of said retention arms and a second longitudinal threaded portion which has an opposite pitch of said first longitudinal threaded portion and is slidably engaged with another said retention arm such that said guiding shaft is rotated, said two retention arms are driven to slide along said guiding shaft in an opposite direction.

14. The portable mounting device, as recited in claim 13, wherein said elongated housing comprises a mounting frame having said fixture side thereon and a holding frame, having said holding side thereon, slidably connected to said mounting frame such that said holding frame is sidewardly slid on said mounting frame for selectively adjusting a position of said entertainment unit with respect to said supporters.

15. The portable mounting device, as recited in claim 13, wherein said elongated housing further has an elongated sliding slot longitudinally formed on said fixture mounting side, wherein each of said retention arms has a gripping hook which is transversely extended from said elongated housing through said sliding slot and is bending outwardly such that said gripping hooks of said retention arms are adapted for substantially engaging with two inner sides of said supporters respectively when said retention distance matches with said distance between said two supporters.

16. The portable mounting device, as recited in claim 15, wherein said elongated housing comprises a mounting frame having said fixture side thereon and a holding frame, having said holding side thereon, slidably connected to said mounting frame such that said holding frame is sidewardly slid on said mounting frame for selectively adjusting a position of said entertainment unit with respect to said supporters.

17. The portable mounting device, as recited in claim 15, wherein said entertainment mounting device comprises two holding arms each having an inner pivot end pivotally mounted on said holding side of said elongated housing and an outer fastening end adapted for detachably engaging with a sidewall of said mobile entertainment unit, and two folding arms, each having a biasing end pivotally connected to said respective holding arms and a sliding end slidably mounted on said holding side of said elongated housing, wherein said sliding ends of said folding arms are slidably blocked at two stopper ends of said elongated housing to substantially retain said holding arms in position that said two holding arms are transversely extended from said elongated housing for engaging said fastening ends of said holding arms at said sidewalls of said mobile entertainment unit so as to securely support said mobile entertainment unit by said supporters.

18. The portable mounting device, as recited in claim 17, wherein said entertainment mounting device further comprises a stopper end regulator provided on said holding side of said elongated housing to fine tune one of said stopper ends thereof so as to stop said respective sliding end of said folding arms at a predetermined position for adjusting a distance between said two folding arms for matching with a width of said mobile entertainment unit.

19. The portable mounting device, as recited in claim 17, wherein said entertainment mounting device further comprises at least a pivot lock, having a non-circular cross section, transversely extended from one of said fastening ends of said respective holding arm for fittingly engaging with a slot on said respective sidewall of said mobile entertainment unit so as to restrict a pivotal movement thereof with respect to said holding arms.

20. The portable mounting device, as recited in claim 17, wherein said elongated housing further has two receiving slots longitudinally formed at two end portions of said holding side respectively and two resilient elements provided at said inner pivot ends of said holding arms respectively for applying an urging force against said holding arms to normally fold said holding arms inwardly to receive in said receiving slots respectively.

21. The portable mounting device, as recited in claim 13, wherein said elongated housing further has an elongated sliding slot longitudinally formed on said fixture mounting side, wherein each of said retention arms has a gripping hook which is transversely extended from said elongated housing through said sliding slot and is bending inwardly such that said gripping hooks of said retention arms are adapted for substantially engaging with two outer sides of said supporters respectively when said retention distance matches with said distance between said two supporters.

22. The portable mounting device, as recited in claim 21, wherein said elongated housing comprises a mounting frame having said fixture side thereon and a holding frame, having said holding side thereon, slidably connected to said mounting frame such that said holding frame is sidewardly slid on said mounting frame for selectively adjusting a position of said entertainment unit with respect to said supporters.

23. The portable mounting device, as recited in claim 21, wherein said entertainment mounting device comprises two holding arms each having an inner pivot end pivotally mounted on said holding side of said elongated housing and an outer fastening end adapted for detachably engaging with a sidewall of said mobile entertainment unit, and two folding arms, each having a biasing end pivotally connected to said respective holding arms and a sliding end slidably mounted on said holding side of said elongated housing, wherein said sliding ends of said folding arms are slidably blocked at two stopper ends of said elongated housing to substantially retain said holding arms in position that said two holding arms are transversely extended from said elongated housing for engaging said fastening ends of said holding arms at said sidewalls of said mobile entertainment unit so as to securely support said mobile entertainment unit by said supporters.

24. The portable mounting device, as recited in claim 23, wherein said entertainment mounting device further comprises a stopper end regulator provided on said holding side of said elongated housing to fine tune one of said stopper ends thereof so as to stop said respective sliding end of said folding arms at a predetermined position for adjusting a distance between said two folding arms for matching with a width of said mobile entertainment unit.

25. The portable mounting device, as recited in claim 23, wherein said entertainment mounting device further comprises at least a pivot lock, having a non-circular cross section, transversely extended from one of said fastening ends of said respective holding arm for fittingly engaging with a slot on said respective sidewall of said mobile entertainment unit so as to restrict a pivotal movement thereof with respect to said holding arms.

26. The portable mounting device, as recited in claim 23, wherein said elongated housing further has two receiving slots longitudinally formed at two end portions of said holding side respectively and two resilient elements provided at said inner pivot ends of said holding arms respectively for applying an urging force against said holding arms to normally fold said holding arms inwardly to receive in said receiving slots respectively.

27. The portable mounting device, as recited in claim 13, wherein said entertainment mounting device comprises two holding arms each having an inner pivot end pivotally mounted on said holding side of said elongated housing and an outer fastening end adapted for detachably engaging with a sidewall of said mobile entertainment unit, and two folding arms, each having a biasing end pivotally connected to said respective holding arms and a sliding end slidably mounted on said holding side of said elongated housing, wherein said sliding ends of said folding arms are slidably blocked at two stopper ends of said elongated housing to substantially retain said holding arms in position that said two holding arms are transversely extended from said elongated housing for engaging said fastening ends of said holding arms at said sidewalls of said mobile entertainment unit so as to securely support said mobile entertainment unit by said supporters.

28. The portable mounting device, as recited in claim 27, wherein said entertainment mounting device further comprises a stopper end regulator provided on said holding side of said elongated housing to fine tune one of said stopper ends thereof so as to stop said respective sliding end of said folding arms at a predetermined position for adjusting a distance between said two folding arms for matching with a width of said mobile entertainment unit.

29. The portable mounting device, as recited in claim 27, wherein said entertainment mounting device further comprises at least a pivot lock, having a non-circular cross section, transversely extended from one of said fastening ends of said respective holding arm for fittingly engaging with a slot on said respective sidewall of said mobile entertainment unit so as to restrict a pivotal movement thereof with respect to said holding arms.

30. The portable mounting device, as recited in claim 27, wherein said elongated housing further has two receiving slots longitudinally formed at two end portions of said holding side respectively and two resilient elements provided at said inner pivot ends of said holding arms respectively for applying an urging force against said holding arms to normally fold said holding arms inwardly to receive in said receiving slots respectively.

31. A portable mounting device for mounting a mobile entertainment unit to a vehicle seat, comprising:
an elongated housing having a fixture mounting side, a holding side and two stopper ends at said holding side;
a fixture mounting unit provided on said fixture mounting side of said elongated housing for detachably mounting said elongated housing to said vehicle seat; and
an entertainment mounting device, which comprises:
two holding arms each having an inner pivot end pivotally mounted on said holding side of said elongated housing and an outer fastening end adapted for detachably engaging with a sidewall of said mobile entertainment unit; and
two folding arms, each having a biasing end pivotally connected to said respective holding arms and a sliding end slidably mounted on said holding side of said elongated housing, wherein said sliding ends of said folding arms are slidably blocked at said two stopper ends of said elongated housing to substantially retain said holding arms in position that said two holding arms are transversely extended from said elongated housing for engaging said fastening ends of said holding arms at said sidewalls of said mobile entertainment unit so as to securely support said mobile entertainment unit by supporters.

32. The portable mounting device, as recited in claim 31, wherein said entertainment mounting device further comprises a stopper end regulator provided on said holding side of said elongated housing to fine tune one of said stopper ends thereof so as to stop said respective sliding end of said folding arms at a predetermined position for adjusting a distance between said fastening ends of said two folding arms for matching with a width of said mobile entertainment unit.

33. The portable mounting device, as recited in claim 32, wherein said stopper end regulator comprises an arm stopper slidably mounted at said respective stopper end of said elongated housing and a fine tuner rotatably connected to said arm stopper to drive said arm stopper to longitudinally slide along said elongated housing at a position that said sliding end of said respective folding arm is slidably blocked by said arm stopper.

34. The portable mounting device, as recited in claim 33, wherein said elongated housing further has two receiving slots longitudinally formed at two end portions of said holding side respectively and two resilient elements provided at said inner pivot ends of said holding arms respectively for applying an urging force against said holding arms to normally fold said holding arms inwardly to receive in said receiving slots respectively.

35. The portable mounting device, as recited in claim 33, wherein said fixture mounting unit comprises two retention arms spacedly provided on said fixture mounting side of said elongated housing wherein at least one of said retention arms is slidably mounted to said elongated housing to define a retention distance between said two retention arms, and an adjuster provided at said elongated housing to selectively adjust said retention distance between said retention arms, wherein when said retention distance of said retention arms is adjusted corresponding to a distance between two supporters of said vehicle seat, said two retention arms are adapted for substantially engaging with said two supporters respectively so as to securely support said elongated housing by said supporters.

36. The portable mounting device, as recited in claim 33, wherein said entertainment mounting device further comprises at least a pivot lock, having a non-circular cross section, transversely extended from one of said fastening ends of said respective holding arm for fittingly engaging with a slot on said respective sidewall of said mobile entertainment unit so as to restrict a pivotal movement thereof with respect to said holding arms.

37. The portable mounting device, as recited in claim 36, wherein said elongated housing further has two receiving slots longitudinally formed at two end portions of said holding side respectively and two resilient elements provided at said inner pivot ends of said holding arms respectively for applying an urging force against said holding arms to normally fold said holding arms inwardly to receive in said receiving slots respectively.

38. The portable mounting device, as recited in claim 37, wherein said fixture mounting unit comprises two retention arms spacedly provided on said fixture mounting side of said elongated housing wherein at least one of said retention arms is slidably mounted to said elongated housing to define a retention distance between said two retention arms, and an adjuster provided at said elongated housing to selectively adjust said retention distance between said retention arms, wherein when said retention distance of said retention arms is adjusted corresponding to a distance between two supporters of said vehicle seat, said two retention arms are adapted for substantially engaging with said two supporters respectively so as to securely support said elongated housing by said supporters.

39. The portable mounting device, as recited in claim 31, wherein said elongated housing further has two receiving slots longitudinally formed at two end portions of said holding side respectively and two resilient elements provided at said inner pivot ends of said holding arms respectively for applying an urging force against said holding arms to normally fold said holding arms inwardly to receive in said receiving slots respectively.

40. The portable mounting device, as recited in claim 31, wherein said entertainment mounting device further comprises at least a pivot lock, having a non-circular cross section, transversely extended from one of said fastening ends of said respective holding arm for fittingly engaging with a slot on said respective sidewall of said mobile entertainment unit so as to restrict a pivotal movement thereof with respect to said holding arms.

41. The portable mounting device, as recited in claim 31, wherein said fixture mounting unit comprises two retention arms spacedly provided on said fixture mounting side of said elongated housing wherein at least one of said retention arms is slidably mounted to said elongated housing to define a retention distance between said two retention arms, and an adjuster provided at said elongated housing to selectively adjust said retention distance between said retention arms, wherein when said retention distance of said retention arms is adjusted corresponding to a distance between two supporters of said vehicle seat, said two retention arms are adapted for substantially engaging with said two supporters respectively so as to securely support said elongated housing by said supporters.

* * * * *